(12) United States Patent
Etter et al.

(10) Patent No.: US 9,101,247 B2
(45) Date of Patent: Aug. 11, 2015

(54) FLOWMETER ASSEMBLY FOR A BEVERAGE MACHINE

(75) Inventors: Stefan Etter, Kehrsatz (CH); Martin Ziegler, Koniz (CH)

(73) Assignee: Nestec S.A., Vevey (CH)

( * ) Notice: Subject to any disclaimer, the term of this patent is extended or adjusted under 35 U.S.C. 154(b) by 370 days.

(21) Appl. No.: 13/513,114

(22) PCT Filed: Nov. 26, 2010

(86) PCT No.: PCT/EP2010/068272
§ 371 (c)(1),
(2), (4) Date: May 31, 2012

(87) PCT Pub. No.: WO2011/067171
PCT Pub. Date: Jun. 9, 2011

(65) Prior Publication Data
US 2012/0234090 A1  Sep. 20, 2012

(30) Foreign Application Priority Data
Dec. 1, 2009  (EP) .................................... 09177590

(51) Int. Cl.
| | |
|---|---|
| *G01F 15/14* | (2006.01) |
| *B65D 6/28* | (2006.01) |
| *A47J 31/44* | (2006.01) |
| *G01F 1/06* | (2006.01) |
| *G01F 1/075* | (2006.01) |
| *G01F 15/18* | (2006.01) |

(52) U.S. Cl.
CPC . *A47J 31/44* (2013.01); *G01F 1/06* (2013.01); *G01F 1/075* (2013.01); *G01F 15/14* (2013.01); *G01F 15/185* (2013.01)

(58) Field of Classification Search
CPC .......... A47J 31/44; G01F 1/06; G01F 15/185; G01F 15/14; G01F 1/075
See application file for complete search history.

(56) References Cited

U.S. PATENT DOCUMENTS

| 4,666,061 A | 5/1987 | Pluess |
|---|---|---|
| 2008/0034886 A1 | 2/2008 | Inagaki et al. |

FOREIGN PATENT DOCUMENTS

| DE | 102007038019 | | 4/2008 |
|---|---|---|---|
| EP | 0457525 | A1 | 11/1991 |
| EP | 0841547 | A2 | 5/1998 |
| EP | 1980826 | A2 | 10/2008 |
| GB | 2382661 | | 6/2003 |
| JP | 2236123 | | 9/1990 |

(Continued)

OTHER PUBLICATIONS

Written Opinion and International Search Report mailed Mar. 3, 2011 for corresponding Intl. Appln. No. PCT/EP2010/068272.

(Continued)

*Primary Examiner* — Lisa Caputo
*Assistant Examiner* — Brandi N Hopkins
(74) *Attorney, Agent, or Firm* — K&L Gates LLP

(57) ABSTRACT

A flowmeter (1) comprises a housing (2,4) delimiting a measuring chamber (10). The housing is formed of a first body (4) and second body (2) that are assembled together by a bayonet connector having a number of pairs of interconnecting securing parts (25, 25', 25a, 26, 26', 26a, 45, 45', 45a). The pairs of securing parts are arranged so that the first and second bodies (2,4) are assemblable in only one position or in a number of different positions that is smaller than the number of pairs of interconnecting securing parts.

19 Claims, 2 Drawing Sheets

(56) References Cited

FOREIGN PATENT DOCUMENTS

| WO | 2009/043865 | A2 | 4/2009 |
| WO | 2009/074550 | A2 | 6/2009 |
| WO | 2009/130099 | A1 | 10/2009 |
| WO | 2010/006953 | A1 | 1/2010 |

OTHER PUBLICATIONS

Office Action issued in JP Application P2012-541418 mailed Dec. 2, 2014, 7 pages.
Russian Office Action for Application No. 2012127369, Dated Oct. 28, 2014, 10 pages.

FLOWMETER ASSEMBLY FOR A BEVERAGE MACHINE

CROSS REFERENCE TO RELATED APPLICATIONS

The present application is a National Stage of International Application No. PCT/EP2010/068272, filed on Nov. 26, 2010, which claims priority to European Patent Application No. 09177590.8, filed on Dec. 1, 2009, the entire contents of which are being incorporated herein by reference.

FIELD OF THE INVENTION

The field of the invention pertains to the assembly of flowmeters, in particular flowmeters for beverage preparation machines.

For the purpose of the present description, a "beverage" is meant to include any liquid food, such as tea, coffee, hot or cold chocolate, milk, soup, baby food, etc.

BACKGROUND ART

Certain beverage preparation machines use capsules containing ingredients to be extracted or to be dissolved; for other machines, the ingredients are stored and dosed automatically in the machine or else are added at the time of preparation of the drink.

Various beverage machines, such as coffee machines, are arranged to circulate liquid, usually water, from a water source that is cold or heated by heating means, to a mixing or infusion chamber where the beverage is actually prepared by exposing the circulating liquid to a bulk or pre-packaged ingredient, for instance within a capsule. From this chamber, the prepared beverage is usually guided to a beverage dispensing area, for instance to a beverage outlet located above a cup or mug support area comprised or associated with the beverage machine. During or after the preparation process, used ingredients and/or their packaging is evacuated to a collection receptacle.

Most coffee machines possess filling means that include a pump for liquid, usually water, which pumps the liquid from a source of water that is cold or indeed heated through heating means, such as a heating resistor, a thermoblock or the like. For instance, U.S. Pat. No. 5,943,472 discloses a water circulation system for such a machine between a water reservoir and a hot water or vapour distribution chamber, for an espresso machine. The circulation system includes valves, a metallic heating tube and a pump that are interconnected with each other and with the reservoir via a plurality of silicone hoses that are joined together by clamping collars. 2009/043865, WO 2009/074550, WO 2009/130099 and PCT/EP09/058562 disclose further fillings means and related details of beverage preparation machines.

To control the characteristics of the liquid circulated to the mixing or infusion chamber, e.g. quantity and/or speed, such machines typically include a flowmeter. The flowmeters used in such beverage machines are made of food safe materials at least where exposed to the circulating fluid and have to be economically affordable to be used in such machines.

U.S. Pat. No. 4,666,061 discloses a flowmeter for beverage dispenser lines for wine, mineral water or beer that can be easily disassembled and reassembled for cleaning. The flowmeter has a two-part housing assembled by a bayonet connector and enclosing a measuring chamber. The chamber contains a centred rotatable measuring body having a rotatable shaft held in pace by a pair of facing diamond point bearings mounted into the housing and extending into the chamber. A drawback of this device lies in the price of the diamond point bearings and the required assembly steps for mounting such point bearings into the housing of the flowmeter.

EP 0 841 547 discloses a flowmeter commercialised by DIGMESA which is suitable for beverage preparation machines. This flowmeter has a two-part housing with a bayonet connection having four assembly hooks symmetrically distributed on the periphery of the housing so as to allow four assembly positions of the two housing parts and thus four corresponding positions of the flowmeter's water inlet and outlet located on the two housing parts. The housing contains an inner measuring chamber with a central fixed shaft extending therethrough for mounting an inner rotatable measuring body with fins that are located in the flow path and that are driven thereby. The flow of liquid passing through the measuring chamber is derived from a measure of the speed of rotation of the rotatable measuring body using a Hall sensor. A drawback of this device lies in the large friction surface between the fixed shaft and the rotating measuring body which changes depending on the orientation of the flowmeter and which also affects the accuracy of the measure of the flow through the chamber.

For some applications, a plurality of bayonet assembly hooks may be required. The number and size of assembly hooks may depend on the expected pressure under which the flowmeter may have to operate as well as on the assembly forces needed to secure imperviousness of the assembly. Hence, more than one or two assembly hooks may be required, as for example disclosed in the above EP 0 841 547. However, there are only very few situations in which a given flowmeter must be able to switch between different configurations. Most of the time a flowmeter takes one assembly configuration only during its lifetime. Therefore, the multitude of assembly positions can lead to unnecessary assembly mistakes since such flowmeters accept more assembly orientations than needed for their actual intended use.

Hence, there is still a need to provide a simple, accurate inexpensive flowmeter, in particular for use in a beverage preparation machine.

SUMMARY OF THE INVENTION

The invention thus relates to a flowmeter, in particular for a beverage preparation machine. The flowmeter comprises a housing delimiting a measuring chamber. The housing is formed of a first body and of a second body that are assembled together by a bayonet connector that has a number of pairs of interconnecting securing parts.

These interconnecting securing parts bear the forces of the bayonet connector upon assembly. They may be formed of a hook, hook-passage and hook-retainer. However, other bayonet configurations are contemplated, as known in the art.

In accordance with the invention, the pairs of securing parts are arranged so that the first and second bodies are assemblable by the bayonet connector in only one position or in a number of different positions that is smaller than the number of pairs of interconnecting securing parts.

Hence, the same cooperating parts that bear and ensure the mechanical securing forces at assembly of the bayonet connector and for maintaining the flowmeter's housing assembled, are used to determine the assembly orientation of the bayonet connector. Typically, no further parts or discrimination arrangements are needed to predetermine the relative positions of the bodies assembled by the bayonet connector.

In particular, no special marking or instruction is needed on the housing bodies or elsewhere to indicate the proper assembly of the flowmeter.

Each of the first and second bodies of the housing may have a through-opening communicating with the measuring chamber for circulating liquid through such flowmeter. Typically, these through-openings form the flowmeter's inlet and outlet. The through-openings may have a relative position depending on the position of the first and second bodies. For example, the first through-opening is located on a first housing body and the second through-opening is located on the second housing body, the through-openings being in particular off-axis from the closure rotation axis of the bayonet connector. Hence, the through-openings may take different relative positions depending on the assembly orientation of the bayonet connector, when the bayonet connector is arranged to be assemblable in different orientations.

It is of course possible to have a fastening arrangement on one housing body, i.e. an arrangement to mount the flowmeter in a device, and have another element on the other housing body that requires a specific orientation relative to the fastening arrangement, such as a through-opening, e.g. inlet or outlet, or a connector for a sensor such as a Hall sensor or for an electric connection. Many circumstances are contemplated why the assembly orientation of the bayonet connector has to be predetermined, including the outer shape of the flowmeter's housing that should be compatible with the environment in which the flowmeter is mounted.

The securing parts can be integrally formed with their respective housing body, e.g. in a moulding process.

At least one pair of interconnecting securing parts may comprise: on the second housing body a hook-retainer and a hook-passage, and on the first housing body a hook arranged to pass the hook-passage and engage with the hook-retainer at assembly of the bayonet connector; and/or on the first housing body a hook and a retainer-passage, and on the second housing body a hook-retainer arranged to pass the retainer-passage and engage with the hook at assembly of the bayonet connector.

Typically, the securing parts of each pair have cooperating shapes for interconnection thereof at assembly of the bayonet connector. The pairs of securing parts of one bayonet connector may have at least two different kinds of cooperating shapes formed so that a securing part of a pair of a first kind is incompatible with a corresponding securing part of another kind.

For instance, a pair of interconnecting securing parts of a first kind has a hook of first dimensions interconnectable with a hook-passage and a hook-retainer of first dimensions, and a pair of interconnecting securing parts of a second kind has a hook of second dimensions interconnectable with a hook-passage and a hook-retainer of second dimensions, the hook of second dimensions being incompatible with the hook-passage and/or hook-retainer of first dimensions so that the first hook cannot be assembled with the second hook-retainer. The hook of second dimensions can be shaped to be too large to pass through the hook-passage of first dimensions and/or to be incompatible with the hook-retainer. The same effect can be obtained with a configuration including a retainer-passage is used instead of or in addition to a hook-passage.

The pairs of securing members can be spaced apart and non-evenly distributed along a contact portion between the first and second bodies.

The housing can be made of two assembled moulded bodies. At least one of the first and second housing bodies can be generally cup-shaped. At least one of the first and second housing bodies may form a cover or lid. One of the housing bodies may have a rim, the other housing body having a seal lip, the seal lip being force-fitted into the rim, or vice versa, for sealing the first and second bodies in particular to avoid leakage of fluid circulated through the flowmeter during use.

Typically, the housing contains a measuring body rotatably mounted in the measuring chamber.

The housing and the measuring body can be made of at least one of POM and PBT. For instance, the housing and the measuring body are made of POM, such as Schulaform 9A, and PBT, such as Tecdur GK30, or vice versa.

In so far as the flowmeter is used in a beverage preparation machine, the materials forming the chamber and the rotatable measuring body should be food safe. Furthermore, they should have a low friction coefficient and a low abrasion rate and be well controllable in the manufacturing/moulding process so as to achieve high dimensional precision to provide a high quality flowmeter, in particular highly reliable, at limited cost. Moreover, these materials should be so controllable in the manufacturing process, e.g. moulding, as to permit the formation of small-sized reliable parts in order to be able to reduce the size of the flowmeter as well as of a device in which such a flowmeter is integrated for use. All these requirements are fulfilled by using the abovementioned materials, in particular in combination.

The abrasion rate of the POM material against the PBT material can be of about 0.2 $\mu$m/km. The abrasion rate of the PBT material against the POM material is typically of about 0.7 $\mu$m/km. Moreover, such POM and PBT materials are food safe. Such an abrasion rate provides a long lifetime for inexpensive moulded flowmeters, e.g. for use in beverage preparation machines.

For instance, the housing and the measuring body may include a stabilising filler, such as fibres or beads, in particular glass beads, such as a stabilising filler representing 10 to 70 vol % of the housing and/or of the measuring body, in particular 15 to 50 vol % such as 20 to 40 vol %. The use of a filler material such as beads and/or fibres leads to an increased control of the shrinkage of the composite material when it consolidates during the moulding step. This is particularly desirable for insuring a high dimensional precision of the relatively movable parts and for a proper assembly of the parts. Moreover, the use of an appropriate filler material provides clean surfaces which can be manufactured with tight tolerances in particular for the bearings. A filler material may also reduce the friction coefficient and abrasion rate. The components produced from such a composite material also exhibit a high stability, in particular for the connecting part, as discussed below. Further details on the use of such materials for the manufacturing of flowmeters are disclosed in EP 09 163 813.0 which is hereby incorporated by reference.

In an embodiment, the rotatable measuring body has a rotatable shaft extending across the measuring chamber, the shaft being rotatably mounted and positioned in the measuring chamber at opposite extremities of the shaft by point bearings. For instance, the shaft is a rotor or like element with flow intercepting parts such as fins or blades, typically an impeller. Each point bearing may be formed of a protruding part and a cooperating facing counter-part, in particular a recessed part, associated, respectively, with the housing and an extremity of the rotatable shaft, or vice versa. The protruding part and the counter-part are advantageously integrally formed with their associated moulded housing and moulded rotatable shaft.

For instance, the housing comprises facing protrusions extending into the chamber for forming the point bearings. Alternatively, the protrusions may be located on the shaft of the measuring body. It is also possible to provide a mixed configuration, i.e. a first bearing with the protrusion on the shaft and a second (opposite) bearing with the protrusion on the housing.

The rotatable shaft typically has a rotation axis that extends between a point bearing located on the second hosing body, e.g. a cover or lid body, and a facing point bearing located on the first housing body, e.g. in a cup-like body of the housing.

The first body may form a reference surface perpendicular to the shaft's rotation axis, the second body having an inner face, that is urged against the reference surface, e.g. the aforementioned contact portion, for precisely setting a spacing between these point bearings so as to hold and allow free rotation of the shaft therebetween. This geometric referencing providing a reliable precise spacing between the point bearings is made possible by the use of the bayonet closure system between the first and second bodies.

Thus, the manufacturing costs of such flowmeter that does not require a diamond or like element for forming the bearing, are significantly reduced. The two bearing parts can be formed during a moulding step of the components they are respectively associated with. The bearing parts can be integrally formed with the static support component and with the moving measuring component, respectively, and no separate assembly step is required therefor. This limits significantly the production costs. The accuracy of the flowmeter is however largely independent from the orientation of the flowmeter. The protruding part and/or counter-part of each point bearing can be made by fusion/solidification and/or polymerization of materials, usually by moulding these materials.

Further optional constructional details of such a flowmeter are for example disclosed in EP 09 163 815.5 which is hereby incorporated by way of reference. For example, the housing can include a connecting arrangement for disconnectably connecting a sensor device thereto, in particular a Hall sensor device.

The invention also relates also to a beverage preparation machine having a liquid circulation circuit, in particular a water circulation circuit, that comprises a flowmeter as described above.

For instance, the machine is a coffee, tea or soup machine, in particular a machine for preparing within an extraction unit a beverage by passing hot or cold water or another liquid through a capsule or pod containing an ingredient of the beverage to be prepared, such as ground coffee or tea or chocolate or cacao or milk powder. The machine may comprise a brewing unit for housing this ingredient. Typically, the machine includes one or more of a pump, heater, drip tray, ingredient collector, liquid tank and fluid connection system for providing a fluid connection between the liquid tank and the brewing unit, etc. The configuration of a fluid circuit between the liquid reservoir and a heater for such a machine is for example disclosed in greater details in WO 2009/074550.

BRIEF DESCRIPTION OF THE DRAWINGS

The invention will now be described with reference to the schematic drawings, wherein.

DETAILED DESCRIPTION

Figure 1:
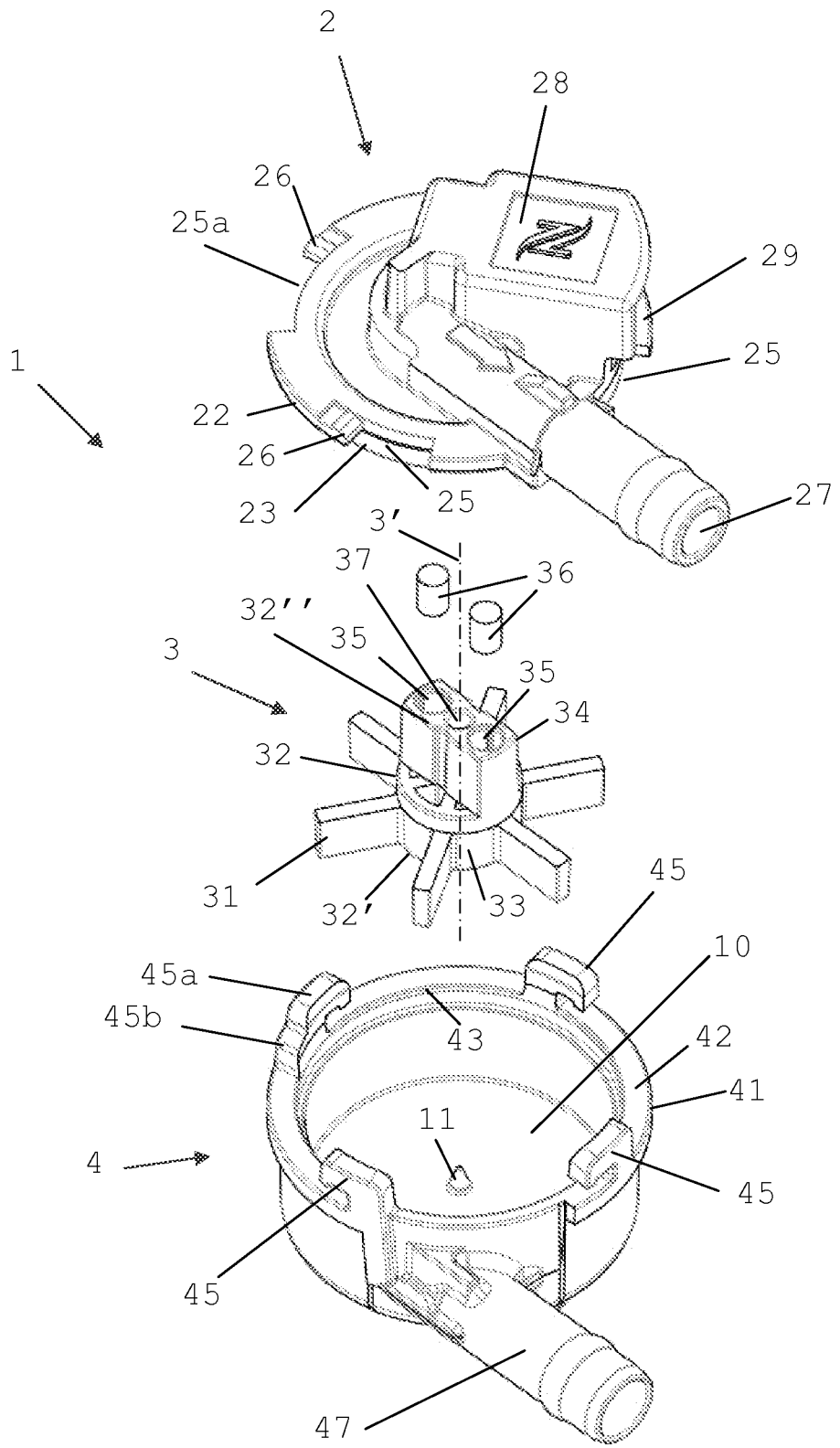
FIG. 1 shows an exploded view of a flowmeter according to the invention.

FIG. 1 shows a flowmeter 1 typically for a beverage preparation machine, such as a coffee machine. The flowmeter may be mounted in the fluid circuit of the beverage preparation machine as for example described in greater details in WO 2009/130099.

Flowmeter 1 has a housing formed of two assembled moulded bodies 2, 4 delimiting an internal generally cylindrical measuring chamber 10. For example, the housing is formed by injection moulding.

Each of the moulded bodies 2, 4 has a through-opening communicating with measuring chamber 10 for circulating liquid through such flowmeter. In particular, a tubular inlet 47 is provided in cup-like body 4 and a tubular outlet 27 is provided in cover body 2. The inlet and the outlet could of course be switched. Moreover, the inlet and the outlet could be located on the same moulded body. These inlet and outlet have a relative position depending on the position of the first and second bodies.

Housing 2, 4 contains a rotatable measuring body 3 in the form of a rotor or impeller. Body 3 has a series of radial members 31, e.g. fins or blades, on a rotatable shaft 32 extending centrally across the measuring chamber 10. Shaft 32 has a lower part 33 from which radial members 31 extend and an upper part 34. Two cavities 35 are provided in upper part 34 for housing a pair of magnets 36 of corresponding shape. Shaft 32 or body 3 may be manufactured by injection moulding as well.

Flowmeter 1 has upper and lower point bearings for mounting opposite extremities 32', 32" of rotatable shaft 32 in housing bodies 2, 4. These point bearings are formed by protrusions of housing 2, 4 extending into chamber 10 and by recesses in extremities 32', 32" of rotatable shaft 32 forming a positioning counter-part for the protrusion, a lower protrusion in the form of a pin 11 and an upper recess 37 of this type forming part of the lower and upper bearings can be seen in FIG. 1. The lower and upper bearings are identical to ensure similar performance in all possible orientations.

Protrusions 11 and counter-parts 37 are integrally formed with the moulded housing bodies 2,4 and the rotatable shaft 32, respectively. In other words no additional component is needed for forming the bearing parts of the flowmeter. These may be moulded directly with the respective components, i.e. housing bodies 2,4 and shaft 32. The shaft or even the entire impeller 3 (except magnets 36) can be made of POM; housing 2, 4 can be made of PBT with 30 vol % glass beads as a filler.

As illustrated in FIG. 1, lower housing body 4 is in the general shape of a cup and upper housing body 2 is in the general shape of a cover or lid. It is understood that the "lower" and "upper" references merely refer to the particular orientation of flowmeter 1 as illustrated in FIG. 1. During use, flowmeter 1 may take any orientation or even change orientation.

Rotatable shaft 32 has a rotation axis 3' that extends between a point bearing (not shown) located at cover body 2 and a facing point bearing 11 located in cup-like body 4.

Cup-like body 4 has a rim 41 forming a reference surface 42 perpendicular to rotation axis, cover body 2 having an inner face 22 that is urged on reference surface 42 for precisely setting a spacing between the point bearings 11 so as to hold and allow free rotation of shaft 32 therebetween. Inner face 22 and reference surface 42 form a contact portion 22, 42 of the bayonet connector.

Furthermore, rim 41 has an upright inner surface 43 cooperating with a corresponding seal lip 23 of cover body 2 for sealing cover body 2 on cup body 4 by force-fitting of lip 23 into rim 41. This assembly and possible variations are shown in greater details in the abovementioned EP 09 163 815.5 and EP 09 163 813.0.

Cup-like body 4 has four spaced apart hooks 45, 45a that are generally evenly distributed on rim 41 and contact portion 22, 42 and that cooperate with corresponding passages 25, 25a and hook retaining parts 26 at the periphery of cover body 2 to form a bayonet connection.

Hooks 45, 45a and hook-retainers 26 with associated hook-passages 25, 25a form the pairs of interconnecting securing parts of the bayonet connector for assembling the housing's bodies 2,4. Hooks 45, 45a are arranged to pass their corresponding hook-passage 25, 25a and then engage with their hook-retainer 26 at assembly. Hooks 45, 45a and hook-retainers 26 are in a resilient respective relationship so as to permit and secure the connection. The interconnecting securing parts can be configured to allow non-destructive disassembly. Alternatively, they may be configured so that a disassembly possibility is not provided and would normally lead to destruction of the bayonet connection and/or at least one housing portion.

As the locking movement at bayonet connector of cover body 2 on cup body 4 is in a plane perpendicular to shaft 32 and rotational axis 3', the spacing between the point bearings is not affected by this locking. This spacing is entirely determined by the geometry (and position) of contact portion 22, 42 relatively to the location of the point bearings so that tight tolerances for the bearings can be provided even though they are formed by moulding and not by additional diamonds. Hooks 45, 45a, hook-passages 25, 25a as well as hook-retainers 26 are integrally formed with housing bodies 2, 4.

In accordance with the invention, the pairs of interconnecting securing parts, e.g. hooks 45, 45a and hook-retainers 25, 25a, are arranged so that the housing bodies 2, 4 are assemblable in only one position in the embodiment shown in FIG. 1.

For instance, the interconnecting securing parts of each pair have cooperating shapes for interconnection thereof, the pairs of securing parts having at least two different kinds of cooperating shapes formed so that a securing part of a pair of a first kind is incompatible with a corresponding securing part of another kind.

In the particular embodiment of FIG. 1, a pair of interconnecting securing parts of a first type of first dimensions has a hook 45 interconnectable via a hook-passage 25 with a hook-retainer 26. A pair of interconnecting securing parts of a second type of second dimensions has a hook 45a interconnectable via a hook-passage 25a with a hook-retainer 26. Hook 45a of the second type is incompatible with hook-passage 25 and/or hook-retainer 26 of the first type. For example, hook 45a of the second type is too large to pass via hook-passage 25 of the first type to reach retainer 26.

In the embodiment shown in FIG. 1, hook 45a of second type is generally similar to hook 45 of the first type. However, hook 45a of the second type has a greater length than hook 45 of the first type, measured along rim 41 or contact portion 22, 42. The increased length results from the longer base of hook 45a due to the presence of a hump 45b. Peripheral passage 25 is long enough to let hook 45 pass. However, passage 25 is to short to let hook 45a with hump 45b pass. Hook 45a with hump 45b may only pass via its dedicated passage 25a that has a length which is increased compared to passage 25 and adapted to the dimensions of hook 45a with hump 45b.

It follows that the only assembly position accepted by body 2 against body 4 is the position resulting from the passage of hook 45a with hump 45b through passage 25a. No other assembly position is possible with the bayonet configuration shown in FIG. 1.

In a variation it is of course possible to have two kinds of pairs of interconnecting securing parts in which the dimensional differences reside concern the hook-retainer with corresponding differences at the level of the hook and/or a retainer-passage.

In another variation, it is of course possible to provide facing identical pairs of interconnecting securing parts distributed so as to allow a number of assembly configurations that is equal to half the number of pairs of interconnecting securing members.

For example, the embodiment shown in FIG. 1 can be modified by replacing hook 45 facing hook 45a across body 4 by a hook 45a with hump 45b and provide a corresponding substitution of passages 25 and 25a in body 2. With such a configuration, bodies 2 and 4 accept two assembly positions, namely a first configuration with inlet 47 and outlet 27 on the same side of flowmeter 1 and a second configuration with inlet 47 and outlet 27 on opposite sides of flowmeter 1, and no further assembly configuration, despite the presence of four pairs of hooks and retainers.

Furthermore, cover body 2 has a socket 28 with a cavity 29 for receiving a sensor plug. The socket and sensor plug, in particular of the Hall type, are disclosed in greater details in the abovementioned EP 09 163 815.5 and EP 09 163 813.0.

During use of flowmeter 1, liquid is circulated from inlet 47 to outlet 27 via chamber 10. The flow of liquid will be intercepted by blades 31 thus driving shaft 32 in rotation about axis 3' between the point bearings at extremities 32', 32" of shaft 32. The speed of rotation of shaft 32 will be proportional to the flow of liquid in chamber 10 and driving measuring body 3. By rotating shaft 32, magnets 36 are rotated adjacent to the Hall sensor in cavity 29. The Hall sensor will detect the rotating magnetic field generated by the magnets and convert it into a corresponding electric signal having a frequency corresponding to the speed of rotation of shaft 32. The information regarding the flow of liquid will then be communicated to a control unit.

Figure 2:
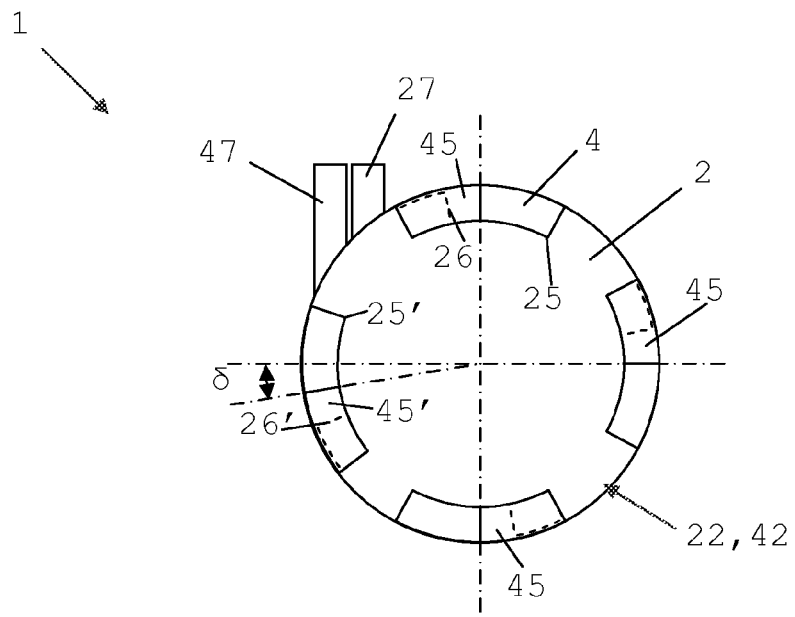
FIG. 2 schematically illustrates a view from above of another flowmeter according to the invention.

In FIG. 2, in which the same numeric references generally designate the same elements, another flowmeter is schematically shown from above upon assembly. Flowmeter 1 has a bayonet connector with four pairs of interconnecting securing parts having each a hook 45, 45' and a hook-retainer 26, 26' (in dotted lines underneath hook 45, 45') cooperating with a hook-passage 25, 25'. Unlike the configuration shown in FIG. 1, hooks 45, 45', hook-retainers 25, 25' and hook-passages 25, 25' have the same dimensions.

However, the pairs of interconnecting securing parts 45, 45', 26, 26' are unevenly distributed over the circular periphery of housing bodies 2, 4. In FIG. 2, three pairs of hooks 45 and hook-retainer 26 are arranged on the periphery at successive angles of 90°, i.e. located respectively at 0°, 90° and 180° over the circular periphery. The fourth pair of hook 45' and hook-retainer 26' is slightly off-set from this distribution arrangement by an angle δ, for example in the range of 3 to 30°, in particular 5 to 15° such as about 10°. Hence, off-set hook 45' and hook-retainer 26' are located on the periphery at angles of 90°−δ and 90°+δ relative to their neighbouring pairs of interconnecting securing parts 45, 26. In this uneven distribution configuration of pairs of interconnecting securing parts, flowmeter 1 may only be assembled according to one position, i.e. the position in which hook 45' cooperates with hook-retainer 26'. Hence, outlet 27 and inlet 47 may only take one relative position, as indicated in FIG. 2.

Figures 3A, 3B:
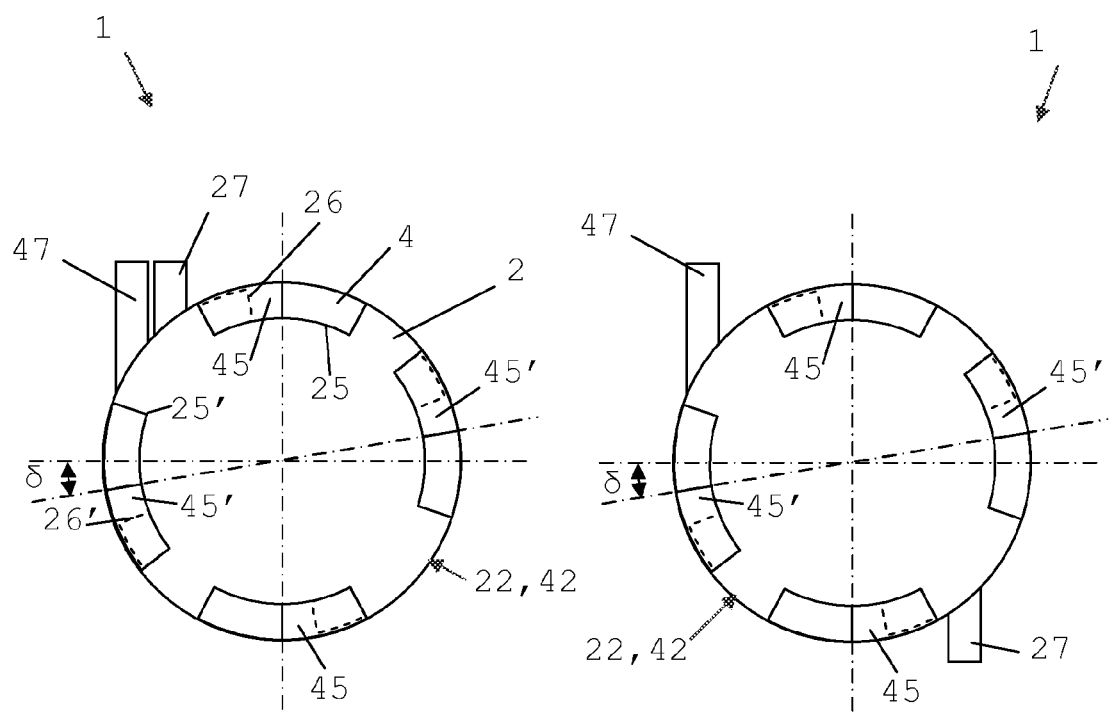
FIGS. 3a and 3b schematically illustrate a view form above of a further flowmeter according to the invention, the flowmeter being shown in two different assembly configurations.

In FIGS. 3a and 3b, in which the same numeric references generally designate the same elements, another flowmeter 1 is schematically shown from above upon assembly. In this embodiment, a number of four pairs of securing members 26, 45 are spaced apart in a non-even distribution along the circular periphery of bayonet connector. In this case, the distribution of the four pairs is such as to permit a number of different assembly positions that is smaller than the number of pairs of interconnecting securing parts, e.g. two different assembly positions.

FIG. 3a shows a first assembly position in which inlet 47 and outlet 27 are located side-by-side. FIG. 3b illustrates a second assembly position in which inlet 47 and outlet 27 are located diametrally opposite to each other, across the circular periphery of flowmeter 1.

In this embodiment of flowmeter 1 of the invention, two facing pairs of interconnecting securing members 26', 45' are off-set by the same angle δ from an even distribution of securing members 26, 26', 45, 45' along the circular periphery of flowmeter 1. In this configuration each hook 45' may cooperated with either of the hook-retainers 26'. Thus, the bayonet connector may be assembled into two different configurations.

A similar result can be obtained by providing a even distribution of pairs of interconnecting securing members which combine two types of interconnecting securing members, i.e. large size and small size types. For instance, an arrangement may include six pairs of interconnecting securing members in which pairs of the same type face each other across the bayonet connector.

In a variation, it is of course possible to combine the interconnecting securing members of different types, as illustrated in FIG. 1, with an un-even distribution of pairs of interconnecting securing members.

Within the scope of this invention, many variations are contemplated, in particular such variations allowing various assembly positions at different angles of various sizes, by adjusting the number and locations and types of the pairs of interconnecting securing members.

The invention claimed is:

1. A flowmeter housing for a beverage preparation machine, the flowmeter housing comprising:
a housing defining a measuring chamber, the housing comprising a first body and a second body that are rotatably assembled together by a bayonet connector having at least two pairs of interconnecting securing parts, a first securing part of each pair coupled to the first body and a second securing part of each pair coupled to the second body,
wherein the securing parts of each pair have cooperating shapes for interconnection thereof, the cooperating shapes of a first pair being different from the cooperating shapes of a second pair,
wherein the first body has a rim and the second body has a seal lip, the seal lip being force-fitted into the rim, or vice versa, for sealing the first and second bodies, and
wherein the first securing part of each pair extends vertically from the rim.

2. The flowmeter housing of claim 1, wherein each of the first and second bodies has a through-opening communicating with the measuring chamber for circulating liquid through the flowmeter, the through-openings having a relative position depending on the position of the first and second bodies.

3. The flowmeter housing of claim 1, wherein the securing parts are integrally formed with their respective housing body.

4. The flowmeter housing of claim 1, wherein at least one pair of the interconnecting securing parts comprises on the second housing body a hook-retainer and a hook-passage, and on the first housing body a hook arranged to pass the hook-passage and engage with the hook-retainer at assembly of the bayonet connector.

5. The flowmeter housing of claim 1, wherein the first pair of the interconnecting securing parts has a first type of hook interconnectable via a hook-passage with a hook-retainer, and the second pair of the interconnecting securing parts of has a second type of hook interconnectable via a hook-passage with a hook-retainer, the hook of the second type being incompatible with the hook-passage and/or hook-retainer of the first type.

6. The flowmeter housing of claim 5, wherein the hook of the second type is too large to pass through the hook-passage of first type.

7. The flowmeter housing of claim 1, wherein the pairs of securing parts are spaced apart and not evenly distributed along a contact portion between the first and second bodies.

8. The flowmeter housing of claim 1, wherein the first and second housing bodies are molded bodies.

9. The flowmeter housing of claim 1, wherein at least one of the first and second housing bodies is generally cup-shaped.

10. The flowmeter housing of claim 1, wherein the housing contains a measuring body rotatably mounted in the measuring chamber.

11. The flowmeter housing of claim 10, wherein the rotatable measuring body has a rotatable shaft extending across the measuring chamber, the shaft being rotatably mounted and positioned in the measuring chamber at opposite extremities of the shaft by point bearings.

12. The flowmeter housing of claim 10, wherein the housing and the measuring body:
are made of POM; and
include a stabilizing filler.

13. The flowmeter housing of claim 11, wherein each point bearing is formed of a protruding part and a cooperating facing counter-part associated, respectively, with the housing and an extremity of the rotatable shaft, or vice versa.

14. The flowmeter housing of claim 11, wherein the rotatable shaft has a rotation axis that extends between a point bearing located at the first body of the housing and a facing point bearing located at the second body of the housing.

15. The flowmeter housing of claim 11, wherein the housing comprises facing protrusions extending into the chamber for forming the point bearings.

16. The flowmeter housing of claim 1, wherein at least one pair of the interconnecting securing parts comprises on the first housing body a hook and a retainer-passage, and on the second housing body a hook-retainer arranged to pass the retainer-passage and engage with the hook at assembly of the bayonet connector.

17. The flowmeter housing of claim 1, wherein at least one of the first and second housing bodies forms a cover or lid.

18. The flowmeter housing of claim 1, wherein the pairs of securing parts are arranged to be assembled in only one position.

19. A beverage preparation machine having a liquid circulation circuit that comprises a flowmeter housing comprising:
a housing defining a measuring chamber, the housing comprising a first body and second body that are rotatably assembled together by a bayonet connector having a at least two pairs of interconnecting securing parts, a first securing part of each pair coupled to the first body and a second securing part of each pair coupled to the second body,
wherein the securing parts of each pair have cooperating shapes for interconnection thereof, the cooperating shapes of a first pair different from the cooperating shapes of a second pair, wherein the first body has a rim and the second body has a seal lip, the seal lip being force-fitted into the rim, or vice versa, for sealing the first and second bodies and wherein the first securing part of each pair extends vertically from the rim.

\* \* \* \* \*